United States Patent
Kliman et al.

(10) Patent No.: US 6,449,564 B1
(45) Date of Patent: *Sep. 10, 2002

(54) APPARATUS AND METHOD FOR MONITORING SHAFT CRACKING OR INCIPIENT PINION SLIP IN A GEARED SYSTEM

(75) Inventors: Gerald Burt Kliman, Niskayuna, NY (US); Suresh Baddam Reddy, Erie, PA (US); Rok Sribar, Mountain View, CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/197,783

(22) Filed: Nov. 23, 1998

(51) Int. Cl.$^7$ .............. G01B 5/28; G01B 5/30; G06F 19/00; G01H 1/00; G01H 11/00
(52) U.S. Cl. .............. 702/35; 702/36; 73/660
(58) Field of Search .............. 702/35, 36, 75, 702/56; 340/680; 73/581, 593, 660, 602

(56) References Cited

U.S. PATENT DOCUMENTS

| | | | |
|---|---|---|---|
| 4,352,293 A | 10/1982 | Kurihara et al. | 73/593 |
| 4,931,949 A * | 6/1990 | Hernandez et al. | 702/35 |
| 4,975,855 A | 12/1990 | Miller et al. | |
| 5,068,800 A * | 11/1991 | Brook et al. | 702/36 |
| 5,159,563 A * | 10/1992 | Miller et al. | 702/35 |
| 5,365,787 A | 11/1994 | Hernandez et al. | 73/660 |
| 5,479,824 A | 1/1996 | Torres | 73/602 |
| 5,533,400 A | 7/1996 | Gasch et al. | 73/593 |
| 5,895,857 A * | 4/1999 | Robinson et al. | 73/660 |

FOREIGN PATENT DOCUMENTS

| | | |
|---|---|---|
| EP | 0178468 | 4/1986 |
| JP | 60195426 | 10/1985 |

OTHER PUBLICATIONS

SU 1300322 A (Trashk Rail Trasport) Jan. 30, 1987, (Abstract), Soviet Inventions Illustrated, Section EL: Electrical, Week 8743, PP 11–12, 1987, London, Derwent Publ. LTD. AN 87–305669/43.

SU 817506 A (Tashk Rail Eng) Apr. 5, 1981, (Abstract), Soviet Inventions Illustrated, Section EL: Electrical, Week E02, PP 24–25, 1982, London Derwent Publication LTD., AN A911E/02.

RU 2082143 C1 (Elektrosila Stock) Jun. 20 1997, (Abstract) [online] [retrieved on Dec. 22, 2000] Retrieved from: WPI—Database.

* cited by examiner

*Primary Examiner*—Marc S. Hoff
*Assistant Examiner*—Mohamed Charioui

(57) ABSTRACT

A diagnostic technique for monitoring shaft cracking or incipient pinion slip involves monitoring a shift in a characteristic natural frequency of an operating system such as a geared system of a locomotive. The technique involves monitoring a shift in the characteristic natural frequency or resonance of a shaft for detecting shaft cracking. The technique also involves monitoring a shift in the characteristic natural frequency of one or more assemblies of the operating system which include a pinion and detecting a shift in the one or more characteristic natural frequencies of the assemblies. A vibration sensor or measurement of current changes of a motor of the operating system can be used to detect vibrations to monitor the characteristic natural frequencies. Torsional oscillations or measurement of current and voltage changes of a motor of the operating system, can also be used to monitor the characteristic natural frequencies.

22 Claims, 5 Drawing Sheets

US 6,449,564 B1

APPARATUS AND METHOD FOR MONITORING SHAFT CRACKING OR INCIPIENT PINION SLIP IN A GEARED SYSTEM

BACKGROUND OF THE INVENTION

This invention relates to shaft cracking and incipient pinion slip, and more particularly, to monitoring shaft cracking and incipient pinion slip in an operating system such as a geared system of a locomotive.

In a geared system, the motion or torque from one shaft is transmitted to another shaft by means of direct contact between toothed wheels or gears. FIG. 1 illustrates one example of a geared system 10 for propelling a locomotive. Geared system 10 includes an electric motor 12 having a drive shaft 14 rotatably supported by bearings 16 which are attached to the locomotive, a rotor 11, a stator 19 with stator windings 21 and leads 23. Attached to one end of drive shaft 14 is a pinion 18. Typically, pinion 18 is fitted and shrunk onto a tapered end 15 of drive shaft 14. Pinion 18 engages a bull gear 20 which attaches to and drives a wheel shaft 22 rotatably supported by bearings 24. The ends of wheel shaft 22 are attached to respective wheels 26 of the locomotive.

Although electric motor 12 is resiliently supported to the locomotive, geared system 10 experiences large mechanical vibrations, e.g., shock loadings due to uneven portions of rails 30. Often, after some period of heavy usage, drive shaft 14 may crack due to fatigue. Similarly, pinion 18 may slip relative to drive shaft 14 without any advanced warning so that torque is no longer transmitted to wheels 26. Such failures can be catastrophic, and repairs such as removal of electric motor 12, refitting of pinion 18, or replacement of drive shaft 14, are expensive, labor intensive, and require that the locomotive be temporarily pulled from service.

Therefore, there is a need for an apparatus and method for low cost, on-line monitoring of an operating geared system in which the apparatus and method are capable of warning of shaft cracking or incipient pinion slip.

SUMMARY OF THE INVENTION

The above-mentioned need is met by the present invention which relates to diagnostic techniques for monitoring shaft cracking or incipient pinion slip in an operating system. In one aspect of the present invention, a method for monitoring shaft cracking or incipient pinion slip in an operating system includes the steps of determining a characteristic natural frequency of the operating system at a first time, determining the characteristic natural frequency at a second time, and comparing the characteristic natural frequency determined at the first time to the characteristic natural frequency determined at the second time to detect a shift in the characteristic natural frequency in response to at least one of shaft cracking and incipient pinion slip.

For monitoring shaft cracking, the characteristic natural frequency is a natural frequency of a shaft of the operating system. For monitoring pinion slip, the characteristic natural frequency is a natural frequency of an assembly including a pinion of the operating system or the characteristic natural frequencies of two coupled assemblies which includes the pinion.

The steps of determining the characteristic natural frequency may include measuring vibrations of the operating system, measuring current of a motor of the operating system, measuring torsional oscillations of the operating system, or measuring current and voltage of a motor of the operating system. Advantageously, the steps of determining the characteristic natural frequency may include the step of performing a fast Fourier transform analysis.

In another aspect of the present invention, an apparatus for monitoring shaft cracking or incipient pinion slip in an operating system, includes a controller adapted to determine a characteristic natural frequency of the operating system at a first time, determine the characteristic natural frequency at a second time, and compare the characteristic natural frequency determined at the first time to the characteristic natural frequency determined at the second time to detect a shift in the characteristic natural frequency in response to at least one of shaft cracking and incipient pinion slip.

In still another aspect of the present invention, an article of manufacture comprises at least one computer usable medium having computer readable program code means embodied therein for causing the monitoring of shaft cracking or incipient pinion slip in an operating system. The computer readable program code means in the article of manufacture comprises computer readable program code means for determining a characteristic natural frequency of the operating system at a first time, determining the characteristic natural frequency at a second time, and comparing the characteristic natural frequency determined at the first time to the characteristic natural frequency determined at the second time to detect a shift in the characteristic natural frequency in response to at least one of shaft cracking and incipient pinion slip.

In yet another aspect of the present invention, at least one program storage device readable by a machine, tangibly embodying at least one program of instructions executable by the machine, performs a method for monitoring shaft cracking or incipient pinion slip in an operating system, as noted above.

DETAILED DESCRIPTION OF THE INVENTION

The present invention provides an on-line diagnostic technique for monitoring shaft cracking or incipient pinion slip in an operating system 10 (FIG. 1) such as a geared system for propelling a locomotive. As discussed in greater detail below, shaft cracking is monitored by observing a shift in the characteristic natural frequency or resonance of drive shaft 14 (due to lateral oscillations or torsional oscillations) over time. Incipient pinion slip is monitored by observing a shift (due to lateral oscillations or torsional oscillations) over time in the characteristic natural frequency or frequencies of one or more assemblies of the geared system due to the coupling between a pinion and a drive shaft.

With respect to shaft cracking, drive shaft 14 has a natural frequency or resonance determined, to a first order, by the distance between its bearings 16, the stiffness of the drive shaft, and the mass of the drive shaft and rotor. To a lesser extent, the fit or tolerance of the bearings, as well as pinion 18, may also influence the characteristic natural frequency of the shaft. If there is a fracture or significant crack in the shaft, the stiffness changes resulting in a change or shift in the characteristic natural frequency of the shaft (due to lateral oscillations or torsional oscillations). The specific characteristic natural frequency of an intact shaft to be observed and monitored can be initially determined by simulating an analytic model or by testing a physical model.

Figure 1:
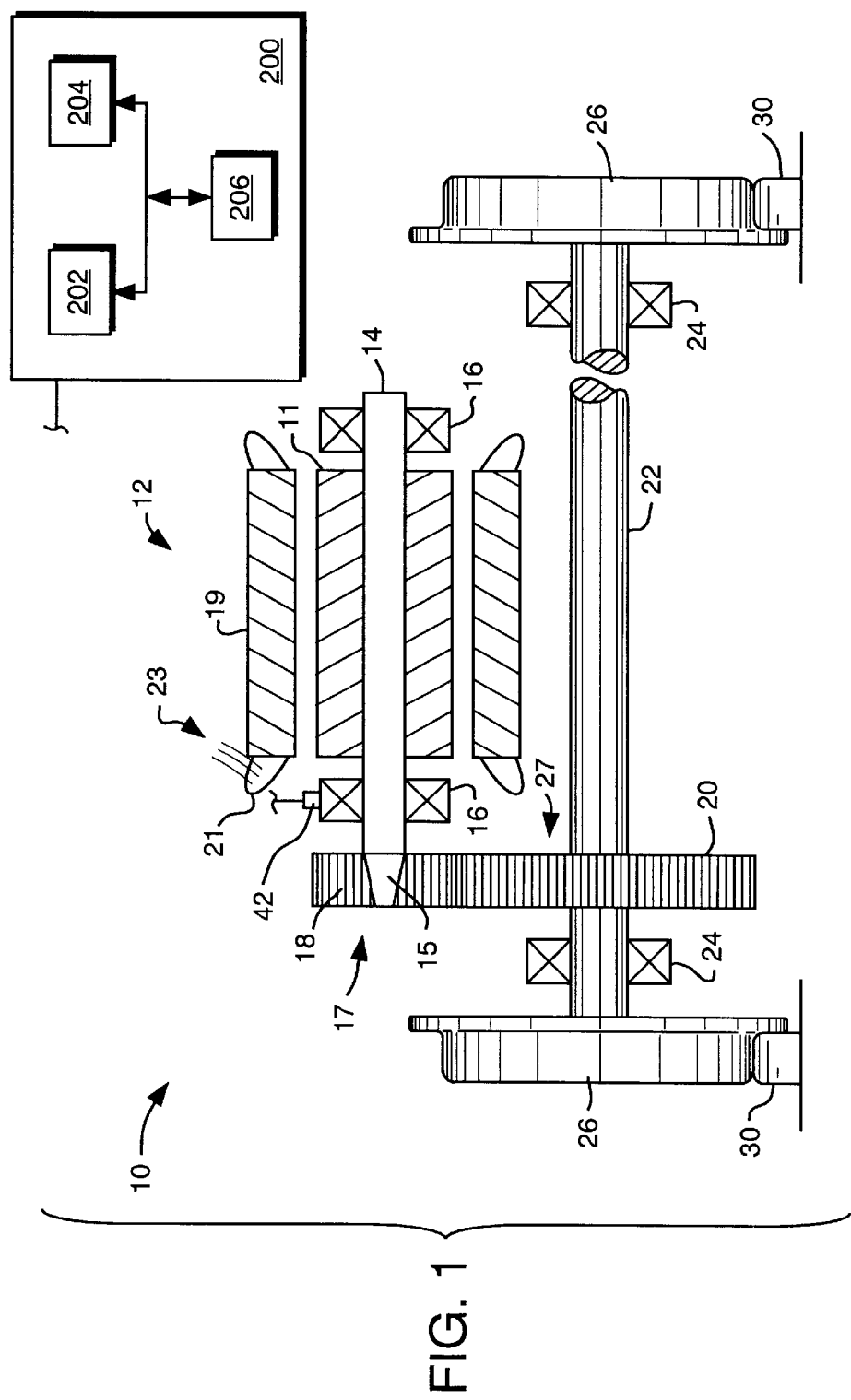
FIG. 1 is a side elevation view, in part section, of a geared system and control system of a locomotive including a vibration sensor positioned in accordance with one embodiment of the present invention.
Figure 2:
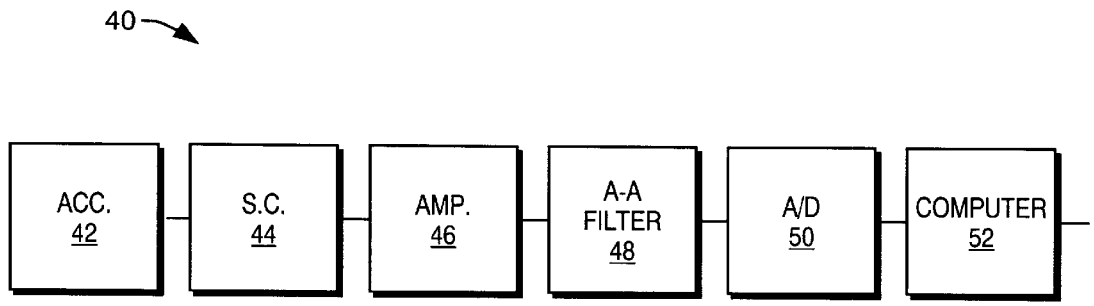
FIG. 2 is a diagrammatic illustration of one embodiment of an apparatus for monitoring shaft cracking or incipient pinion slip during the operation of the geared system shown in FIG. 1.

FIG. 2 diagrammatically illustrates one embodiment of an apparatus 40 for monitoring shaft cracking in the geared system 10 (FIG. 1). Apparatus 40 includes a vibration sensor 42 such as an accelerometer mounted to one of bearings 16 (FIG. 1) for monitoring vibrations (lateral oscillations) occurring in geared system 10 during operation. Alternatively, vibration sensor 42 may be mounted on stator 19 of electric motor 12 (FIG. 1).

Figure 3:
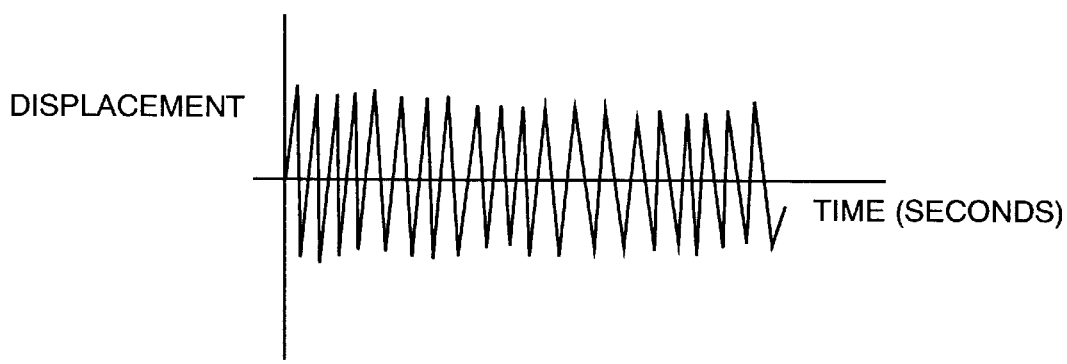
FIG. 3 is a graph of a signal representing vibrations or displacements over time during the operation of the geared system shown in FIG. 1.

The output signal from vibration sensor 42 is a composite or resultant signal of the many vibrations which occur in geared system 10 during operation. The vibrations or displacements of geared system 10 over time can be represented in graphical form, as shown in FIG. 3. In this exemplary embodiment, the output signal from vibration sensor 42 is passed through a signal conditioner 44, an amplifier 46, an antialiasing filter 48, and an analog to digital converter 50.

Figure 4:
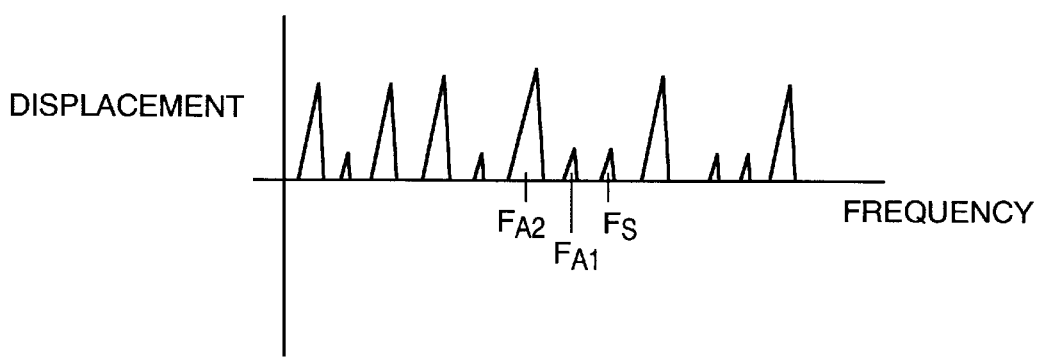
FIG. 4 is a graph of the frequency components of the signal, shown in FIG. 3, as a result of a fast Fourier transform analysis.

A computer 52 receives the resultant signal from analog to digital converter 50 and determines the various characteristic natural frequency components that make up the resultant signal. In one embodiment, the determination is made using fast Fourier transform (FFT) analysis, for example. Suitable computer software programs are readily available for performing an FFT analysis of the resultant output signal to determine the characteristic natural frequency components that make up the resultant signal. FIG. 4 illustrates the result of the FFT analysis and characteristic natural frequency Fs of drive shaft 14.

Figure 5:
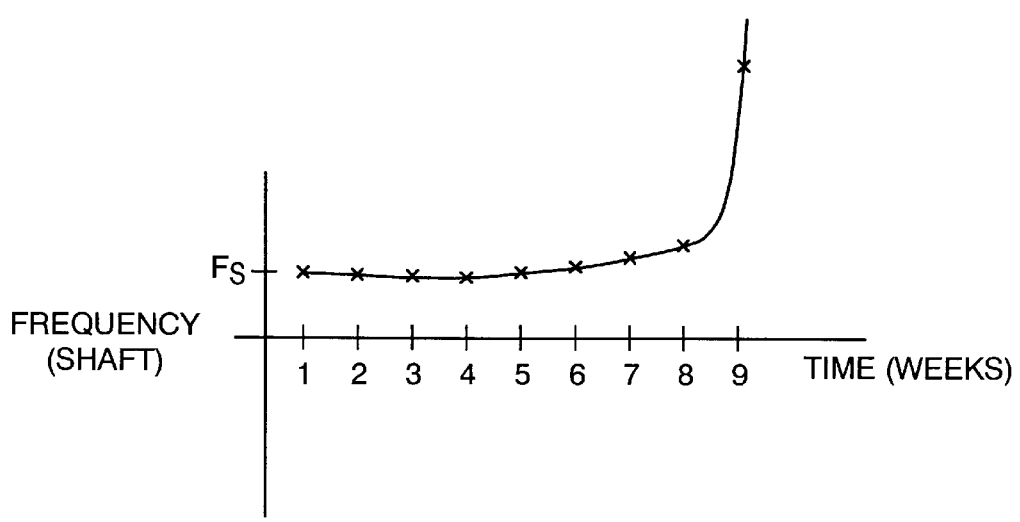
FIG. 5 is a graph of the change or shift, over time, in the characteristic natural frequency of the drive shaft shown in FIG. 1 during operation.

Characteristic natural frequency Fs is then monitored and tracked over time, e.g., days, weeks or months. FIG. 5 illustrates the results of the tracking of characteristic natural frequency Fs over time. For example, computer 52 compares a first determination of characteristic natural frequency Fs to a second later determination of characteristic natural frequency Fs to detect a shift in the characteristic natural frequency Fs in response to the initial stage of shaft cracking or further propagation of one or more cracks. In this illustrated example, after week 4 the characteristic natural frequency of the drive shaft is observed to increase, which may be on the order of only a few percent, to indicate the beginning of a crack or further propagation of one or more cracks in the shaft. If the crack or cracks continue to grow, failure may occur, e.g., as observed between week 8 and week 9 of FIG. 5. In addition, a determination of the magnitude of the crack in the shaft can be determined based on the magnitude of the shift by comparison to analytical or physical model determinations.

Figure 6:
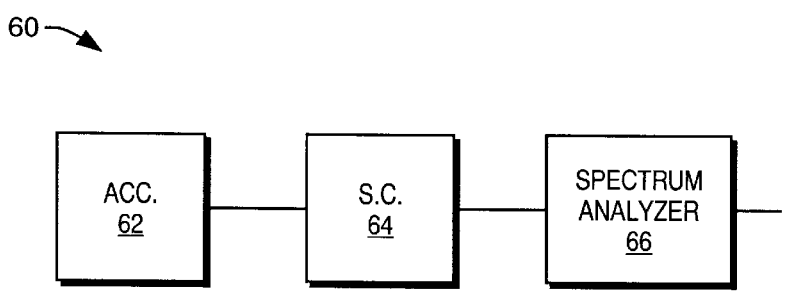
FIG. 6 is a diagrammatic illustration of an alternative embodiment of an apparatus for monitoring shaft cracking or incipient pinion slip during the operation of the geared system shown in FIG. 1.

FIG. 6 diagrammatically illustrates an alternative apparatus 60 for detecting displacements or vibrations of geared system 10 and monitoring the characteristic natural frequencies of geared system 10. In this illustrated embodiment, apparatus 60 comprises an vibration sensor 62, a signal conditioner 64, and a spectrum analyzer 66 which selects the characteristic natural frequency components of the resultant signal from the vibration sensors during operation of geared system 10.

Apparatuses 40 (FIG. 2) and 60 (FIG. 6) are also desirably operable to monitor incipient pinion slip due to the loss or decrease in the area of contact between pinion 18 (FIG. 1) and drive shaft 14 (FIG. 1). In another aspect of the present invention and with reference to FIG. 1, the characteristic natural frequency monitored corresponds to an assembly which includes pinion 18, e.g., pinion 18 and drive shaft 14. As with shaft cracking, a shift in characteristic natural frequency of this assembly can be used to indicate a reduction in the area of contact between the pinion 18 and drive shaft 14.

Since the characteristic natural frequency of the assembly of pinion 18 and drive shaft 14 would be close to the characteristic natural frequency of drive shaft 14 (pinion 18 typically has a relatively small mass compared to drive shaft 14), in another aspect of the present invention, desirably, two independent coupled assemblies of geared system 10 are utilized to monitor incipient pinion slip.

For example, with reference still to FIG. 1, a first assembly 17 includes electric motor 12, drive shaft 14, bearings 16, and pinion 18 which will have a first independent characteristic natural frequency $F_{A1}$ (FIG. 4). In addition, a second assembly 27 includes wheel shaft 22, bearings 24, bull gear 20, and wheels 26 which will have a second independent characteristic natural frequency $F_{A2}$ (FIG. 4) which can be monitored by the same sensor, as shown in FIGS. 1 and 4, or by a separate sensor (not shown). While the coupling between the teeth of pinion 18 and the teeth of bull gear 20 is generally constant, the coupling between the two assemblies 17 and 27 will both change or shift with a change in the stiffness of the fit between pinion 18 and drive shaft 14.

If the contact between the pinion and the shaft extends over the maximum possible contact area, the coupling should be reasonably stiff. However, if there is substantially less contact area, pinion 18 becomes more flexible with respect to drive shaft 14, so that the stiffness of the coupling will be less with consequently a shift in both the individual characteristic natural frequencies of assembly 17 and assembly 27. Thus, by determining and monitoring the characteristic natural frequencies of the two above-noted assemblies, the monitoring of pinion slip is essentially a function of the entire mass of the geared systems. As with shaft cracking, the characteristic natural frequencies of the two assemblies can be initially predetermined by an analytic model or by testing a physical model.

By tracking the shift in the characteristic natural frequencies of both these two assemblies, incipient pinion slip can be detected. In addition, a determination of the loss of contact area between the drive shaft and the pinion can be determined based on the magnitude of the shift by comparison to the analytical or physical model. Loss of contact area, in turn, implies reduced capability of the fit to sustain high torques, hence, increased likelihood of pinion slip under heavy loading.

Figure 7:
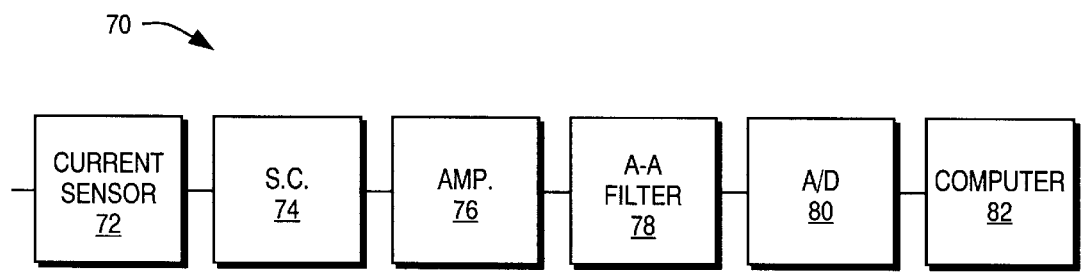
FIG. 7 is a diagrammatic illustration of an alternative embodiment of an apparatus for monitoring shaft cracking or incipient pinion slip during the operation of the geared system shown in FIG. 1.

In another aspect of the present invention electric motor 12 may be employed for monitoring the desired characteristic natural frequencies instead of vibration sensors. Vibration sensors, while suitable, are delicate devices and require cables which can become loose and have a limited operable life. For example, lateral oscillations of the motor (e.g., radial motions) due to the vibrations of the geared system during operation cause the air gap between the rotor 11 and the stator 19 (FIG. 1) to vary. This effect causes a change in the magnetic flux, which results in small changes in the flow of current through motor windings 21. FIG. 7 diagrammatically illustrates an apparatus 70 for detecting characteristic natural frequencies of geared system 10 shown in FIG. 1 via measurement of the current to motor 12 by a current sensor 72 which in one embodiment is coupled to one of leads 23 of motor 12.

Figure 8:
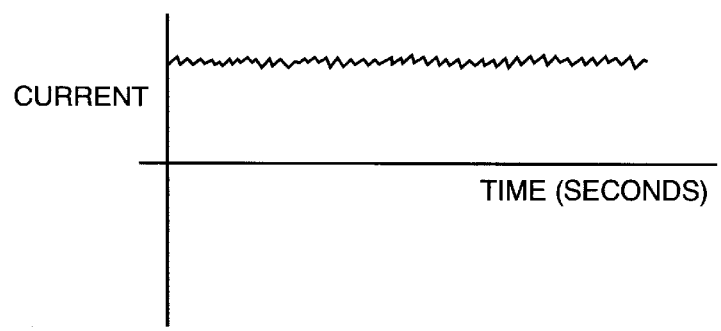
FIG. 8 is a graph of a signal over time representing the current supplied to the motor of the geared system shown in FIG. 1.

The current to a DC motor over time, while generally constant also contains small variations in the current due to lateral oscillations of the motor, as illustrated in FIG. 8. The small variations in the current can be detected by current sensor 72, e.g., a shunt having a low resistance. Alternatively, a current sensor having sensor windings (not shown) which wrap around electrical current lead 23 (FIG. 1) to the motor can be employed. For example, the changing current to the motor will cause a changing current in the sensor windings. A signal can be applied to the sensor windings to reduce the changing current in the sensor windings to zero. The signal applied to the sensor windings of the current sensor will correspond to the variations in the current to the motor. Such current measuring sensors are available from LEM Instruments, Inc. of Torrance, California, for example.

Figure 9:
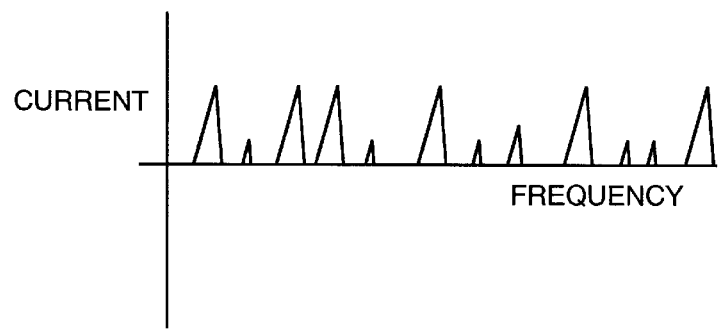
FIG. 9 is a graph of the frequency components of the signal, shown in FIG. 8, as a result of a fast Fourier transform analysis.

In one embodiment, the output signal from current sensor 72 is passed through a signal conditioner 74, an amplifier 76, an antialiasing filter 78, and an analog to digital converter 80. The resultant signal from analog to digital converter 80 is then supplied to a computer 82 which determines the various characteristic natural frequency components that make up the resultant signal, as illustrated in FIG. 9. In one embodiment, the computer analysis includes a fast Fourier transform of the resultant signal from the analog to digital converter. As discussed above, one or more characteristic natural frequencies can be monitored to detect a shift in response to shaft cracking or incipient pinion slip.

Figure 10:
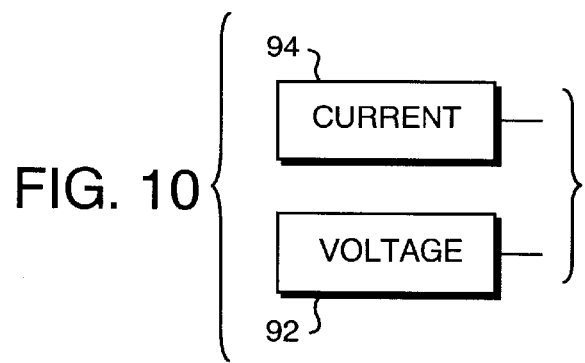
FIG. 10 is a partial diagrammatic illustration of still another alternative embodiment of an apparatus for monitoring shaft cracking or incipient pinion slip during the operation of the geared system, shown in FIG. 1.

In still another aspect of the invention, the torque of electric motor 12 (FIG. 1) is utilized for determining torsional oscillations of the geared system 10 which can also be correlated to various characteristic natural frequencies of drive shaft 14 (FIG. 1) and the coupling between pinion 18 (FIG. 1) and drive shaft 14 (FIG. 1). For example, with DC motors, calculation of the torque is a function of the voltage and the current. As shown in FIG. 10, a voltage sensor 92 and a current sensor 94 can be operably connected to the electrical power leads to motor 12 (FIG. 1). The output signals may be combined to determine the torque which can then be processed as described above with regard to apparatuses 40, 60, and 70.

Figure 11:
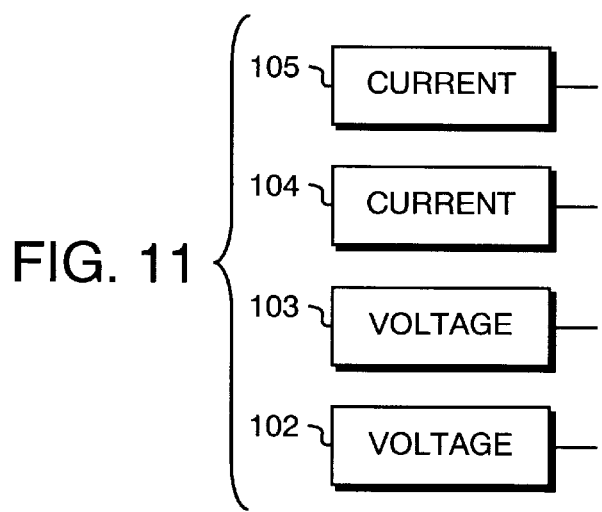
FIG. 11 is a partial diagrammatic illustration of yet another alternative embodiment of an apparatus for monitoring shaft cracking or incipient pinion slip during the operation of the geared system, shown in FIG. 1, in which the motor is an AC motor.
Figure 12:
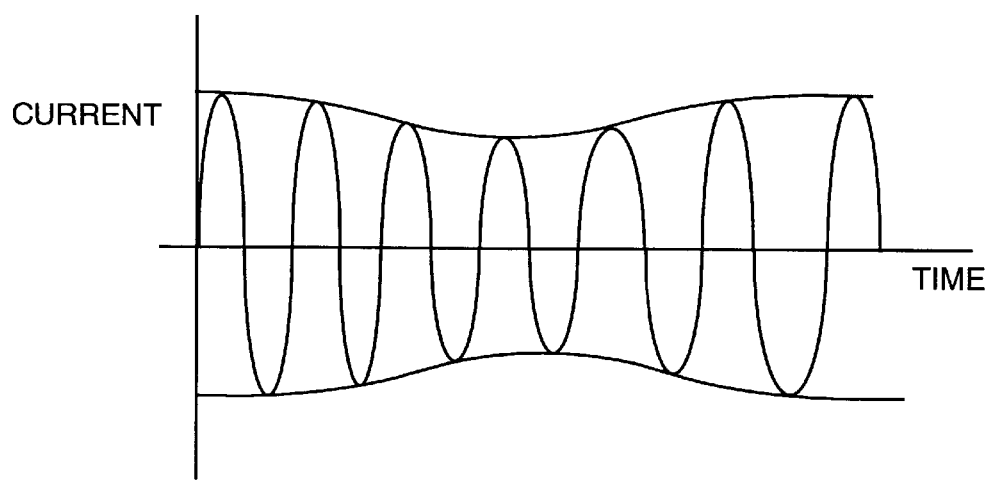
FIG. 12 is a graph of a signal representing the alternating current supplied over time to an AC motor of the geared system, shown in FIG. 1.

For AC motors, two voltage sensors 102 and 103, and two current sensors 104 and 105 (FIG. 11), are operably connected to electrical power leads 23 of an AC motor 12 of geared system 10 (FIG. 1). The output signals may be operably combined to determine the torque which can be processed, as described above with regard to apparatuses 40, 60, and 70. In addition, in the case of an AC motor, the AC current of sensor 104 or 105 will modulate, as illustrated in FIG. 12. This modulation can be detected by an amplitude demodulation detector (not shown) to select out the varying signal which, in turn, can be FFT analyzed to select out the component characteristic natural frequencies and processed, as described above, with reference to apparatuses 40, 60, and 70.

The above noted apparatuses may be embodied in or combined with a controller or computing environment 200 such as the locomotive's elaborate control system depicted in FIG. 1. Computing environment 200 includes, for instance, at least one central processing unit 202, a memory or main storage 204, and one or more input/output devices 206. Computing environment 200 may be provided as a single system environment or multiple system environment for running an operating system.

As is known, central processing unit 202 is the controlling center and provides the sequencing and processing facilities for instruction execution, interruption action, timing functions, initial program loading, and other machine related functions. The central processing unit 202 executes at least one operating system, which, as known, is used to control the operation of computing processing unit 202 by controlling the execution of other programs, controlling communication with peripheral devices and controlling use of the computer resources.

Central processing unit 202 is coupled to main storage 204, which is directly addressable and provides for high speed processing of data by central processing unit 202. Main storage may be either physically integrated with the CPU or constructed in stand alone units. Desirably, main storage 204 may store predetermined characteristic natural frequencies of one or more shafts in the operating system, and one or more assemblies of the geared system, which can be used in selecting out and monitoring the actual characteristic natural frequencies of the operating system, as well as determining the magnitude of a crack or pinion slip.

Main storage 204 is also coupled to one or more input/output devices 206. These devices include, for instance, keyboards, communications controllers, teleprocessing devices, printers, magnetic storage media (e.g., tape cartridges or disks), optical storage media (e.g., CD-ROMs), direct access storage devices, and sensor-based equipment (e.g., vibration sensors 42, current sensors 72, 94, 104, and 105, and voltage sensors 92, 102, and 103). Data is transferred from main storage 204 to input/output devices 206, and from the input/output devices back to main storage 204.

From the present description, computer readable program code means for use in computing environment 200 and for implementing the diagnostic techniques of the present invention may be readily programmed by those skilled in the art and stored on the above-noted storage media or devices, or imbedded in an integrated circuit. The technique may be fully automated or require manual input of various parameters prior to undertaking a diagnostic procedure.

It will also be appreciated by those skilled in the art that measurements from the vibration sensors, current sensors and voltage sensors may be made at periodic intervals while the geared system of the locomotive is operating under a load. This can be downloaded and processed remotely, or alternatively, the measurement processed onboard and, if a frequency change or phase shift is detected, a warning can be issued to the engineer. If the measurements are to be stored on the locomotive, desirably an FFT analysis is performed to reduce the amount of data to be stored. In addition, from the present description, it will be appreciated that the present invention may be applied to monitoring shaft cracking and incipient slip of each motor-driven wheel assembly of the locomotive.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for monitoring shaft cracking or incipient pinion slip in an operating system, the apparatus comprising:
    a controller adapted to determine, at a first time, a first characteristic natural frequency of a first assembly of the operating system and a second characteristic natural frequency of a second coupled assembly of the operating system;
    the controller adapted to determine, at a second time, the first characteristic natural frequency of the first assembly and the second characteristic natural frequency of the second coupled assembly; and
    the controller adapted to compare the first and second characteristic natural frequencies determined at the first time to the first and second characteristic natural frequencies determined at the second time to detect a shift in the first and second characteristic natural frequencies in response to at least one of shaft cracking and incipient pinion slip.

2. The apparatus according to claim 1, wherein the first characteristic natural frequency is a natural frequency of a first assembly comprising an electric motor, a drive shaft, bearings, and a pinion of the operating system.

3. The apparatus according to claim 2, wherein the second characteristic natural frequency is a natural frequency of a second assembly comprising a wheel shaft, bearings, a bull gear, and wheels of the operating system, wherein the pinion and the bull gear are mechanically coupled.

4. The apparatus according to claim 1, wherein the controller is adapted to determine the first and second characteristic natural frequencies in response to vibration measurements of the operating system.

5. The apparatus according to claim 4, wherein the controller is adapted to determine the first and second characteristic natural frequencies by using a fast Fourier transform analysis of the vibration measurements.

6. The apparatus according to claim 1, wherein the controller is adapted to determine the first and second characteristic natural frequencies in response to current measurements of a motor of the operating system.

7. The apparatus according to claim 1, wherein the controller is adapted to determine the first and second characteristic natural frequencies in response to torsional oscillation determinations of the operating system.

8. The apparatus according to claim 1, wherein the controller is adapted to determine the first and second characteristic natural frequencies in response to current and voltage measurements of a motor of the operating system.

9. The apparatus according to claim 1, wherein the operating system is a geared system.

10. The apparatus according to claim 9, wherein the operating system is a geared system of a locomotive.

11. A method for monitoring shaft cracking or incipient pinion slip in an operating system, the method comprising:
    determining, at a first time, a first characteristic natural frequency of a first assembly of the operating system and a second characteristic natural frequency of a second coupled assembly of the operating system;
    determining, at a second time, the first characteristic natural frequency of the first assembly and the second characteristic natural frequency of the second coupled assembly; and
    comparing the first and second characteristic natural frequencies determined at the first time to the first and second characteristic natural frequencies determined at the second time to detect a shift in the first and second characteristic natural frequencies in response to at least one of shaft cracking and incipient pinion slip.

12. The method according to claim 11, wherein the first assembly comprises a pinion.

13. The method according to claim 12, wherein the second coupled assembly comprises a bull gear mechanically coupled to the pinion.

14. The method according to claim 11, wherein determining the first and second characteristic natural frequencies at the first and second times comprises measuring vibrations of the operating system.

15. The method according to claim 11, wherein determining the first and second characteristic natural frequencies at the first and second times comprises measuring current of a motor of the operating system.

16. The method according to claim 11, wherein determining the first and second characteristic natural frequencies at the first and second times comprises measuring torsional oscillations of the operating system.

17. The method according to claim 11, wherein determining first and second characteristic natural frequencies at the first and second times comprises measuring current and voltage of a motor of the operating system.

18. The method according to claim 11, wherein determining the first and second characteristic natural frequencies at the first and second times comprises performing a fast Fourier transform analysis of the measured current.

19. The method according to claim 11, wherein the operating system is a geared system.

20. The method according to claim 11, wherein the operating system is a geared system of a locomotive.

21. An apparatus for monitoring shaft cracking or incipient pinion slip in an operating system, the apparatus comprising:
    means for determining, at a first time, a first characteristic natural frequency of a first assembly of the operating system and a second characteristic natural frequency of a second coupled assembly of the operating system;
    means for determining, at a second time, the first characteristic natural frequency of the first assembly and the second characteristic natural frequency of the second coupled assembly; and means for comparing the first and second characteristic natural frequencies determined at the first time to the first and second characteristic natural frequencies determined at the second time to detect a shift in the first and second characteristic natural frequencies in response to at least one of shaft cracking and incipient pinion slip.

22. An article of manufacture comprising:

at least one computer usable medium having computer readable program code means embodied therein for causing the monitoring of shaft cracking or incipient pinion slip in an operating system, the computer readable program code means in the article of manufacture comprising:

computer readable program code means for determining, at a first time, a first characteristic natural frequency of a first assembly of the operating system and a second characteristic natural frequency of a second coupled assembly of the operating system;

computer readable program code means for determining, at a second time, the first characteristic natural frequency of the first assembly and the second characteristic natural frequency of the second coupled assembly; and computer readable program means for comparing the first and second characteristic natural frequencies determined at the first time to the first and second characteristic natural frequencies determined at the second time to detect a shift in the first and second characteristic natural frequencies in response to at least one of shaft cracking and incipient pinion slip.

* * * * *